Figure 1:
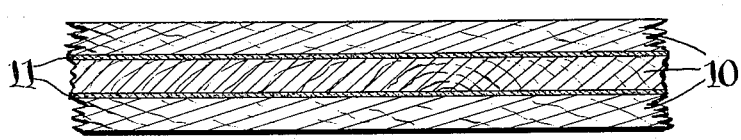

INVENTOR
BY  Harry M. Dent
Bean & Brooks. ATTORNEYS

Patented July 4, 1933

1,917,020

UNITED STATES PATENT OFFICE

HARRY M. DENT, OF BUFFALO, NEW YORK, ASSIGNOR TO GENERAL PLASTICS, INC., OF NORTH TONAWANDA, NEW YORK

COMPOSITE ARTICLE AND METHOD OF BONDING WITH RESIN SOLUTIONS

Application filed May 12, 1932. Serial No. 610,943.

The present invention relates to a method for bonding cellulosic and fibrous materials together for the production of composite articles, and to the articles produced therefrom.

Composite articles as for instance, ply wood have been produced heretofore, but all the methods of production produce articles which are subject to various defects and disadvantages.

My invention contemplates the production of composite articles, as for instance, ply wood, veneered furniture, lumber cores, and other articles built up from cellulosic or fibrous materials, by the use of specially prepared and conditioned bonding agents applied to and subsequently treated, together with the articles to be bonded, under controlled conditions whereby a composite bonded article is produced which is resistant to action of water at the bonded surfaces and which in addition posesses a materially greater resistance to shear than bonded articles currently in use.

As a bonding agent I propose to use resinous substances prepared in a finely divided form such as a dispersion, or emulsion, or other solution wherein the bonding material comprises essentially a liquid medium and a resinous material dispersed therewith, or wherein the final bonding material may be said to be a solution in the colloidal state or condition.

In the preparation of ply woods and veneered articles heretofore the bonding effect has been produced by glues or adhesives used in conjunction with a liquid vehicle. The adhesives comprised vegetable glues, blood glues, casein, and solution of resins in solvents, as for instance shellac. Upon application of the adhesive to the surfaces to be bonded, the adhesive and the vehicle penetrate into the fiber structure of the wood and a great portion of the adhesive is lost insofar as the bonding action is concerned; the strength of the bond residing in the adhesive between the surfaces of the pieces to be bonded.

In the present invention a procedure of bonding is disclosed wherein the bonding material does not penetrate into the structure of the articles to be bonded but remains substantially entirely upon the surfaces of the articles and presents a bond of maximum strength and resistance to shear. To this end the invention prescribes the use of a colloidal dispersion containing a synthetic resin as the bonding agent. Upon application of such colloidal solution to the surfaces of the articles to be bonded, substantially the entire quantity of such colloidal solution is retained upon the surface thereof and only a very unsubstantial portion enters the interior of the article. In the main the non-adhesive portion of the solution only enters the article, the adhesive portion remaining upon the surface to produce the bonding action when subjected to heat.

The resinous substances which may be used comprise synthetic resins of the "thermo-setting" type, phenol-aldehyde resin, phthalic anhydride-glycerine resins, etc., or synthetic resins with some admixture of a fusible resin therewith.

For instance, phenol and formaldehyde are caused to react in any conventional way whereby a condensation occurs normally with the production of a phenol formaldehyde resin, and the resultant resinous material dispersed or homogenized by subjecting the material to an homogenizing treatment, as for instance passage through a colloid mill. The homogenizing of the substance may be performed at any desirable stage during or after the condensation reaction and while the material is thermo-plastic or while still liquid. According to the conventional procedure, a dispersing agent or "protective" material may be used with the resin and the liquid medium which may form the continuous phase of the resultant colloid solution. Depending upon the type of resin used, the dispersion medium may be water, alcohol, or mixed solvents, all well known in the art which may be a non-solvent, or partial solvent for the resin. The colloid or dispersion aid, which may be called the protective colloid, may comprise certain gums possessing this property, certain soaps and other materials possessing the property of aiding in the dispersion and possessing a stabilizing action on the resultant colloidal or dispersed solution.

As an example, 60 parts of a synthetic resin, as for instance a phenolic resin are subjected to the homogenizing action of the colloid mill in the presence of 40 parts of water and 10 parts of gum ghatti and the resultant colloidal homogenized fluid to semi-fluid mass used for bonding purposes.

The dispersed colloidal resinous bonding agent is applied to a surface to which it is desired to attach or bond an additional cellulosic or fibrous element by means of a glue spreader or by any suitable brushing or spraying device, depending upon the condition and consistency of the bonding agent, and the coating subsequently air dried at room temperature for a short period of time, for instance on the order of 15 minutes to 30 minutes or so. The element to be bonded to the coated piece is placed thereon and the assembled pieces subjected to pressure by means of a hydraulic press, or other suitable pressure producing devices, and subjected to a pressure up to the crushing strength of the assembled elements or pieces. This pressure may be as high as 400 pounds per square inch for hard wood such as maple.

During the period of pressure treatment, the assembled articles are subjected to an elevated temperature which is ordinarily supplied by steam under pressure, and I have found that good bonding occurs when the pressing operation is performed at temperatures corresponding to a steam pressure of about 125 pounds per square inch. The heating operation is continued until the bonding action of the bonding material is completed, the liquid being driven out of the bond and a definite "glue line" of the bonding agent being produced. In the usual case, this operation requires in the neighborhood of one to three minutes or more. When employing certain other types of dispersed resins somewhat longer periods of time may be required.

It will be apparent that the method of procedure comprises the completion of the bonding action in short periods of time and at elevated temperatures as for instance, temperatures in the neighborhood of 125° C. to 150° C., although temperatures other than these may be used depending upon the material to be bonded and the agent employed to effect the bonding action.

Although I have illustrated a method of carrying out the invention in conjunction with the preparation of composite articles built up of a plurality of individual articles of cellulosic nature or composition, the invention comprises the preparation of ply wood wherein the multi-ply article is extremely resistant to shearing action and wherein the bonding agent is very resistant to the action of water, being insoluble therein and possessing substantially no tendency to swell when in contact with water. Thus, I have been able to produce ply wood whose resistance to shear is very materially greater than that usually specified by the trade. Whereas the normal specification calls for a resistance to shear of from 150 to 250 pounds per square inch, ply wood made by the use of colloidal dispersions of resin and in substantial accordance with the method outlined herein, are able to withstand a shearing action of from about 250 to 400 pounds per square inch, and I have been able to produce in exceptional cases materials which will resist shear in excess of 400 pounds per square inch.

My invention also comprehends the production of veneered articles, such as articles of furniture, by the procedure outlined above.

Further, my invention comprehends the production of composite articles in which fibrous or unified cellulosic materials, as for instance, paper and fiber board, can be united to wood or cellulosic bases, or for the production of composite boards or ply boards composed of a plurality of composite fiber plies. Under such circumstances the amount of pressure which may be effective used is limited by the crushing strength of the fiber board or fabric, and in such cases the pressures used are somewhat less than the maximum crushing pressure which the fiber will withstand. Wood or lumber cores may also be produced according to the method outlined.

The temperatures which are recommended in the production of multi-ply fiber board are advantageously those above specified except in cases where such temperature would induce decomposition of the fibers in the plies. These cases would of course be exceptional and the temperatures in the neighborhood of 125° C. would be effectively used although temperatures of 150° C. produce a composite article of very desirable properties.

In the drawing:

Fig. 1 illustrates a composite article comprising three plies of wood, as at 10, with the bonding agent 11 therebetween, made in accordance with my invention.

Figure 2:
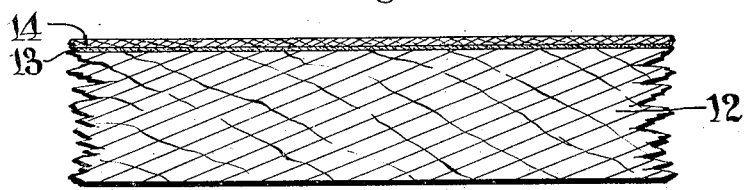

Fig. 2 shows an article such as a table top, built up from a wood base 12, and a veneer strip 14, held in place by a bonding material 13, treated according to my invention.

Figure 3:
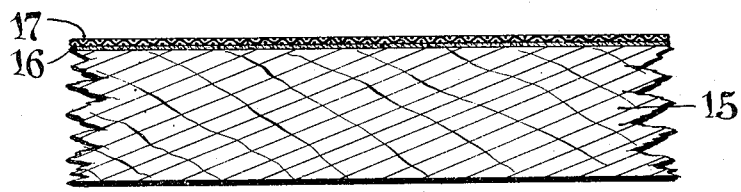

Fig. 3 shows a wood base 15 and a fiber covering 17 bonded with a colloidal resin 16.

It will be seen from the foregoing that the present invention provides an article of manufacture possessing distinct commercial advantage, as the structures are light in weight, durable, resistant to the action of water and in all respects exceeds the maximum physical requirement for such articles as currently specified, and provides a method for producing such articles.

The term "composite article" as used in the claims, refers to an article of manufacture wherein the bonded components comprising the article retain their initial characteristics, the article having been produced from individual components having certain portions of their surfaces bonded together and wherein the areas adjacent the bonded surfaces of the individual components are substantially co-extensive and substantially co-planar and wherein the amount of bond present in the finished article is less than 30% by weight.

What is claimed is:

1. The method of producing bonded composite articles from wooden plies, which comprises coating at least one of the plies to be bonded with a dispersion comprising a resin and a liquid non-solvent for the resin, placing the wooden plies adjacent one another with the resin dispersion interposed therebetween, and subjecting the assembled wooden plies and the bonding material to heat and pressure for a time sufficient to drive the liquid non-solvent out of the bond and produce a definite glue line of permanently set resin.

2. The method of producing bonded composite articles from wooden plies which comprises coating at least one of the plies to be bonded with a dispersion comprising a resin and a liquid non-solvent for the resin, subjecting the coated articles to a preliminary air drying operation, placing the wooden plies adjacent one another with the resin dispersion interposed therebetween and subjecting the assembled wooden plies and bonding material to heat and pressure for a time sufficient to produce a definite glue line of permanently set resin.

3. An article of manufacture comprising a composite article of wooden plies bonded with a resin, said article having been produced by coating at least one of the plies to be bonded with a dispersion comprising a resin and a liquid non-solvent for the resin, placing the wooden plies adjacent one another with the resin dispersion interposed therebetween, and subjecting the assembled wooden plies and the bonding material to heat and pressure for a time sufficient to drive the liquid non-solvent out of the bond and produce a definite glue line of permanently set resin.

4. An article of manufacture comprising a composite article of wooden plies bonded with a resin, said article having been produced by coating at least one of the plies to be bonded with a dispersion comprising a resin and a liquid non-solvent for the resin, subjecting the coated article to a preliminary air drying operation, placing the wooden plies adjacent one another with the resin dispersion interposed therebetween and subjecting the assembled wooden plies and bonding material to heat and pressure for a time sufficient to produce a definite glue line of permanently set resin.

HARRY M. DENT.